Oct. 24, 1967  T. E. WILKEY  3,348,427

REMOTE CONTROL ASSEMBLY

Filed April 9, 1965

INVENTOR.
Thomas E. Wilkey
BY
Barnard, McGlynn & Reising
ATTORNEYS

United States Patent Office 3,348,427
Patented Oct. 24, 1967

3,348,427
REMOTE CONTROL ASSEMBLY
Thomas E. Wilkey, Barto, Pa., assignor to Teleflex Incorporated, North Wales, Pa., a corporation of Delaware
Filed Apr. 9, 1965, Ser. No. 446,966
8 Claims. (Cl. 74—502)

ABSTRACT OF THE DISCLOSURE

A remote control assembly including a fitting with a conduit attached to the fitting, the fitting having a first bore therethrough and a flexible motion transmitting core element movably disposed in the conduit and the bore in the fitting and further including a resilient tubular member secured to the fitting and intersecting at least a portion of the bore in the fitting for bearing against the core element to provide a predetermined frictional resistance to movement of the core element.

---

Remote control assemblies of the instant type heretofore utilized typically comprise a guide having a flexible conduit secured to an end fitting adapted to be attached to a support with a motion transmitting core element movably disposed within the conduit and the end fitting. One end of the motion transmitting core element is adapted to be connected to an element to be controlled while the other end has a knob or the like attached thereto for moving the core element relative to the guide.

Such remote control assemblies are variously utilized in marine, automotive and aircraft vehicles. For example, such remote control assemblies are typically utilized in automobiles to operate hood latches and air vent controls. For instance, the guide comprising a conduit and end fitting may be secured to the support structure of the automobile such that one end of the core element is attached to a vent control while the other end of the core element is disposed in the instrument panel area so that it is manually accessible from the front seat of the automobile in order that the position of the vent control may be changed to control the amount of air flowing into the automobile.

Often, the element being controlled, such as a vent in an automobile, is designed to maintain the position to which it is moved by friction. Frequently, the element to be controlled due to wear and the like does not retain sufficient inherent frictional forces in order to maintain itself in a position to which it has been moved by a control assembly. That is to say, a vent control in an automobile may be moved to a given position by the control assembly yet air flowing by the vent control may be sufficient to move the vent control due to the fact that the vent control does not have sufficient inherent frictional resistance against movement to sustain itself in the position to which it has been moved by the control assembly.

A solution to this problem is to fabricate the remote control assembly such that there is a proper amount of frictional resistance to the movement of the core element within the conduit and the end fitting. However, in order to fabricate a remote control assembly which provides the desired degree of frictional resistance to the movement of the core element within the conduit and the end fitting, the tolerances which must be maintained in the manufacture of the conduit and the end fitting are critical and cannot consistently be maintained in the manufacturing process if the control assembly is to be made at a commercially feasible cost.

In addition to the desirability to have a predetermined amount of frictional resistance to the movement of the core element within the guide comprising the conduit and the end fitting to retain the element to be controlled in a particular position, there are other environments in which it is desirable to have a predetermined amount of frictional resistance to the movement of the core element. For example, there are many situations wherein it is desirable to have a remote control assembly of the instant type provide a resistance to the movement of the core element so that upon manual movement thereof, the operator may firmly and precisely manually operate the control assembly. In contradistinction, if there is no resistance to movement of the core element within the guide, the slightest contact by the operator with the core element would tend to move the core element a great distance very quickly. Therefore, some resistance to movement of the core element provides a remote control assembly which may be utilized for precise control of the element to be controlled.

Accordingly, it is an object and feature of this invention to provide a remote control assembly which is simply and economically manufactured and possesses a predetermined amount of frictional resistance to movement of the core element movably supported within the guide of the assembly.

Another object and feature of the present invention is to provide an improved remote control assembly having a guide adapted to support a movable motion transmitting core element with a friction means secured to the guide for providing a predetermined frictional resistance to the movement of the core element relative to the guide.

In general, these and other objects of this invention are attained by a remote control assembly including a guide comprising a flexible conduit and an end fitting attached thereto with a bore extending therethrough. A core element is movably disposed in the bore through the conduit and the end fitting. The end fitting has a second bore extending therethrough transverse to the first bore and at least partially intersecting the first bore. A resilient friction means for providing a predetermined amount of resistance to the movement of the core element is secured in the second bore to bear against the core element so that the core element is held against movement between the first bore and the resilient friction means until a predetermined force is applied to the core element to move it relative to the conduit and end fitting.

Other objects and attendant advantages of this invention will be readily appreciated as the same becomes better understood by reference to the following detailed description when considered in connection with the accompanying drawings wherein.

Figure 1:
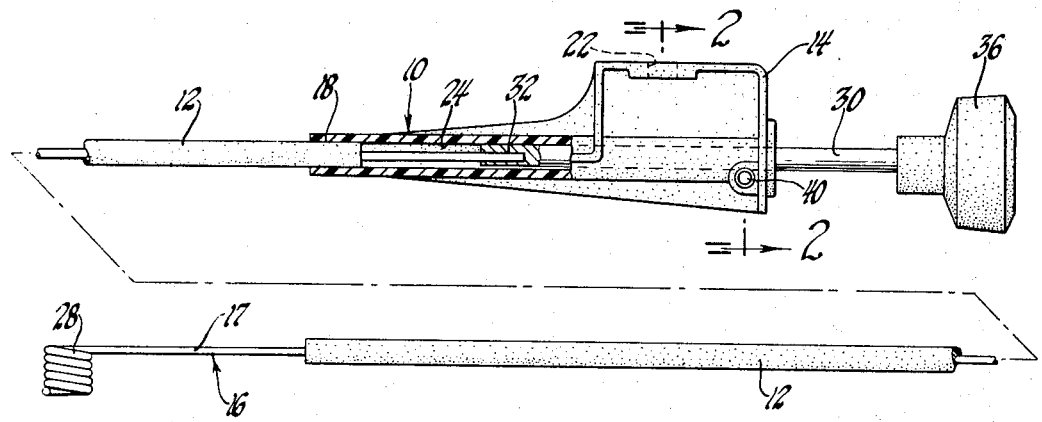
FIGURE 1 is a side elevational view partially in cross section of a preferred embodiment of the remote control assembly of the instant invention.

Referring now to the drawings, wherein like reference numerals indicate like or corresponding parts throughout the several views, there is shown, generally at 10, a remote control assembly including a guide having a flexible conduit 12 and an end fitting 14 for movably supporting a motion transmitting core element, generally shown at 16.

The flexible conduit 12 is attached to the end fitting 14 at 18 by an appropriate bond, such as by bonding a plastic end fitting 14 to a plastic conduit 12. The flexible conduit 12 has a bore therethrough in which is disposed the movable core element 16. The motion transmitting core element 16 includes a wire-like rod 17 and a bar 30.

The end fitting 14 is adapted to be attached to a support structure by the flat surface 20 and the holes 22. Bolts, screws, or the like, may be inserted through the holes 22 and attached to a support structure such as the instrument panel of an automobile. The end fitting 14 has a bore 24 extending therethrough. The bore 24 has a flat portion 26 which extends therealong.

The motion transmitting core element 16 has a first end 28 which extends from the flexible conduit 12 and has a means comprising an eyelet for attachment to an element to be controlled such as a vent in an automobile. The core element 16 at the other end extends within the end fitting 14 and includes the bar 30. The bar 30 is attached to the wirelike rod 17 of the core element 16 at 32 by swaging, welding, or the like. The bar 30 has a flat section 34 to match the bore 24 and the flat portion 26 thereof so that the bar 30 is slidably supported in the end fitting 14 but is prevented from rotating relative to the end fitting 14. As will hereinafter become more clear, the instant invention is illustrated with a push-pull type remote control assembly but it may also be utilized in a rotary type remote control system.

A knob 36, or the like, is attached to the end of the bar 30 so that the core element 16 may be moved within the guide comprising the flexible conduit 12 and the end fitting 14.

The end fitting 14 has a second bore 38 extending therethrough transverse to the bore 24 and at least partially intersecting the bore 24. The bore 38 is disposed so as to intersect the flat portion 26 of the bore 24.

Figure 2:
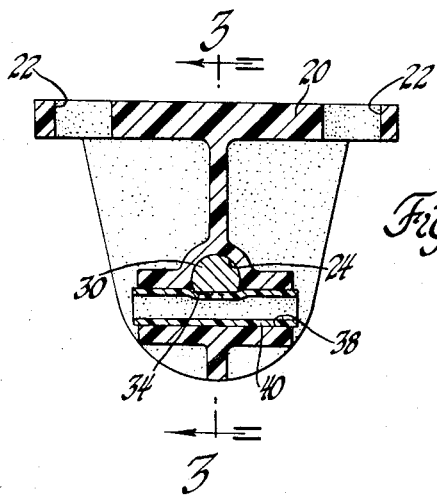
FIGURE 2 is an enlarged cross-sectional view taken along line 2—2 of FIGURE 1.
Figure 3:
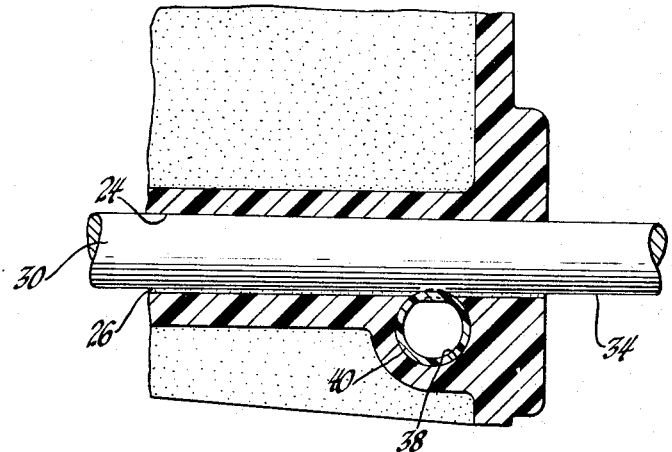
FIGURE 3 is an enlarged fragmentary view in cross section taken along line 3—3 of FIGURE 2.

A friction means taking the form of a resilient tubular member 40 is disposed in the bore 38 for providing a predetermined amount of resistance to the movement of the core element 16. A tubular member 40 bears against the flat section 34 of the bar 30 so that the bar 30 is frictionally held against movement between the bore 24 and the tubular member 40. The motion transmitting core element 16, therefore, is held against movement until a predetermined force is applied to the bar 30 through the knob 36. The tubular member 40 may or may not be depressed along the portion in contact with the bar 30 as shown in FIGURE 2 depending upon the clearance between the bar 30 and the bore 24. However, the tubular member 40 will always provide resistance to the movement of the bar 30.

The invention, therefore, provides a remote control assembly comprising a guide including the flexible conduit 12 and the end fitting 14 having a bore therethrough for movably supporting a motion transmitting core element 16 with a resilient friction means 40 secured to the guide to extend at least partially into the bore to bear against the core element 16 for providing a predetermined amount of resistance to the movement of the core element 16.

The resilient friction means is illustrated as a tubular member 40 which may be made of various materials, polyethylene having been found satisfactory; however, it will be evident to those skilled in the art that the resilient friction means, illustrated as the tubular member 40, may be of any one of many configurations and may be secured to the end fitting 14 or conduit 12 in various ways so as to bear against various portions of the motion transmitting core element 16.

As alluded to previously, the invention has been illustrated with a push-pull core element 16 which is prevented from rotating in the guide, however, it will be clear to those of ordinary skill in the art that the invention may be utilized equally as well with a rotary core element to provide a predetermined amount of resistance to the rotation of such core element.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

I claim:
1. A remote control assembly comprising: a guide having a first bore therethrough, a core element movably disposed in said first bore in said guide, said guide having a second bore therethrough transverse to said first bore and at least partially intersecting said first bore, and friction means for providing a predetermined amount of resistance to the movement of said core element including a resilient member fixed in said second bore to bear against one side of said core element so that said core element is held against movement between said first bore and said resilient member until a predetermined force is applied to said core element to move said core element, that portion of said core element bearing against said resilient member being of constant cross section therealong.

2. A remote control assembly as set forth in claim 1 wherein said first bore has a flat portion extending along a predetermined length of said guide, said core element has a portion of the length thereof which has a flat section so as to conform to said flat portion of said first bore to prevent rotation of said core element in said first bore, and said resilient member disposed so as to bear against said flat section of said core element.

3. A remote control assembly as set forth in claim 1 wherein said resilient member comprises a resilient tubular member secured in said second bore to intersect a portion of said first bore for bearing against said core element.

4. A remote control assembly as set forth in claim 3 wherein said guide includes a fitting adapted to be attached to a support structure and through which said first bore extends, said second bore being disposed through said fitting to intersect at least a portion of said first bore in said fitting.

5. A remote control assembly as set forth in claim 4 wherein said guide further includes a conduit for movably supporting said core element, said conduit being secured to said fitting.

6. A remote control assembly as set forth in claim 5 wherein said core element includes a bar to match the configuration of said first bore in said fitting, said tubular member disposed to bear against said bar.

7. A remote control assembly of the type having a guide supporting a movable core element, said assembly comprising: a flexible conduit; an end fitting having a first bore therethrough secured to a first end of said conduit and adapted to be attached to a support structure; a core element extending through said conduit and said first bore in said end fitting; said core element having a first end extending from the second end of said conduit with means for attachment to an element to be controlled; said core element having a second end extending within said end fitting; means attached to said second end of said core element for moving said core element including a bar to match said first bore in said end fitting so that said bar is movably supported in said end fitting; said end fitting having a second bore extending therethrough transverse to and at least partially intersecting said first bore; and friction means for providing a predetermined amount of resistance to the movement of said core element including a resilient tubular member secured in said second bore to bear against said bar so that said bar is frictionally held against movement between said first bore and said member until a predetermined force is applied to said bar to move said bar.

8. A remote control assembly of the type having a guide supporting a movable core element, said assembly comprising: a flexible conduit; an end fitting having a first bore therethrough secured to a first end of said conduit and adapted to be attached to a support structure; said first bore in said end fitting having a flat portion extending therealong; a core element extending through said conduit and said first bore in said end fitting; said core element having a first end extending from the second end of said conduit with means for attachment to an element to be controlled; said core element having a second end extending within said end fitting; means attached to said second end of said core element for moving said core element and including a bar having a flat section to match said first bore in said end fitting so that said bar is slidably supported in said end fitting and is prevented from rotating relative to said end fitting; said end fitting having a second bore extending therethrough transverse to and at least partially intersecting said first bore; said second bore being disposed so as to intersect said flat portion of said first bore; and friction means for providing a predetermined amount of resistance to the movement of said core element and including a resilient tubular member secured in said second bore to bear against said flat section of said bar so that said bar is frictionally held against movement between said first bore and said tubular member until a predetermined force is applied to said bar to move said bar.

References Cited
UNITED STATES PATENTS

| | | | |
|---|---|---|---|
| 1,303,061 | 5/1919 | Herwig. | |
| 1,905,664 | 4/1933 | Weatherhead | 74—502 X |
| 2,222,346 | 11/1940 | Eickstaedt | 74—527 |
| 2,234,623 | 3/1941 | Crouse | 74—502 |
| 2,329,859 | 9/1943 | Snell | 74—503 |
| 2,357,940 | 9/1944 | Du Lude. | |
| 2,446,355 | 8/1948 | Wright | 74—527 |
| 2,451,730 | 10/1948 | Greenlee | 74—527 |
| 2,636,068 | 4/1953 | Perkins | 287—115 |
| 2,769,352 | 11/1956 | Elliott | 74—503 |
| 3,101,205 | 8/1963 | Benham. | |
| 3,144,919 | 8/1964 | Foote et al. | 188—67 |

FOREIGN PATENTS 729,722   5/1932   France.

OTHER REFERENCES

Product Engineering, "Rollpin," Feb. 3, 1958, volume 29, #5.

FRED C. MATTERN, JR., *Primary Examiner.*

C. F. GREEN, *Assistant Examiner.*